(12) United States Patent
Nguyen et al.

(10) Patent No.: US 9,912,240 B1
(45) Date of Patent: Mar. 6, 2018

(54) HIGHLY SCALABLE MULTIPHASE POWER SUPPLY WITH CONSTANT ON-TIME DC-DC CONVERTERS

(71) Applicant: Monolithic Power Systems, Inc., San Jose, CA (US)

(72) Inventors: James Nguyen, San Jose, CA (US); Jinghai Zhou, Cupertino, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 15/288,941

(22) Filed: Oct. 7, 2016

(51) Int. Cl.
*H02M 3/158* (2006.01)
*H02M 1/36* (2007.01)

(52) U.S. Cl.
CPC ............. *H02M 3/158* (2013.01); *H02M 1/36* (2013.01)

(58) Field of Classification Search
CPC .............. H02M 3/158; H02M 3/1584; H02M 2003/1586; H02M 3/1588
See application file for complete search history.

(56) References Cited

U.S. PATENT DOCUMENTS

| | | | | |
|---|---|---|---|---|
| 6,819,577 B1* | 11/2004 | Wiktor | ............... | H02J 1/102 323/282 |
| 7,215,102 B2* | 5/2007 | Harris | ............... | H02M 3/1584 323/268 |
| 7,368,959 B1* | 5/2008 | Xu | ............... | H02M 3/1584 327/141 |
| 7,397,230 B2* | 7/2008 | Tabaian | ............... | H02M 1/08 323/222 |
| 8,558,524 B2* | 10/2013 | Carroll | ............... | H02M 3/1584 323/272 |
| 8,963,519 B2* | 2/2015 | Zambetti | ............... | H02M 3/156 323/271 |
| 2005/0083024 A1* | 4/2005 | Harris | ............... | H02J 1/102 323/282 |
| 2011/0133553 A1* | 6/2011 | Bui | ............... | H02M 3/158 307/31 |
| 2014/0097818 A1* | 4/2014 | Wiktor | ............... | H02M 3/156 323/283 |
| 2015/0236580 A1* | 8/2015 | Jiang | ............... | H02M 3/1584 327/150 |
| 2016/0315538 A1* | 10/2016 | Nguyen | ............... | H02M 3/1584 |

* cited by examiner

*Primary Examiner* — Timothy J Dole
*Assistant Examiner* — Sisay G Tiku
(74) *Attorney, Agent, or Firm* — Okamoto & Benedicto LLP (57) ABSTRACT

A multiphase power supply includes several constant ON-time (COT) DC-DC converter integrated circuits (ICs). One of the COT DC-DC converter ICs generates a synchronization signal, which is received in parallel by the other COT DC-DC converter ICs. Two or more COT DC-DC converter ICs are turned ON at the same time in synchronization with the synchronization signal (e.g., an edge of a pulse of the synchronization signal) that is received in parallel and with another synchronization signal that is propagated from one COT DC-DC converter IC to another.

18 Claims, 11 Drawing Sheets

HIGHLY SCALABLE MULTIPHASE POWER SUPPLY WITH CONSTANT ON-TIME DC-DC CONVERTERS

BACKGROUND OF THE INVENTION

1. Field of the Invention

The present invention relates generally to electrical circuits, and more particularly but not exclusively to DC-DC converters and power supplies.

2. Description of the Background Art

A DC-DC converter converts an input voltage to an output voltage, which is higher than the input voltage in the case of a boost converter or lower than the input voltage in the case of a buck converter. Several DC-DC converters may be employed together to form a multiphase power supply, with the DC-DC converters providing output voltages at different phases. A dedicated pulse width modulation (PWM) controller can be used to synchronize the DC-DC converters to generate interleaved output voltages. However, a dedicated controller increases the cost and complexity of the multiphase power supply.

SUMMARY

In one embodiment, a multiphase power supply includes several constant ON-time (COT) DC-DC converter integrated circuits (ICs). One of the COT DC-DC converter ICs generates a synchronization signal, which is received in parallel by the other COT DC-DC converter ICs. Two or more COT DC-DC converter ICs are turned ON at the same time in synchronization with the synchronization signal (e.g., an edge of a pulse of the synchronization signal) that is received in parallel and with another synchronization signal that is propagated from one COT DC-DC converter IC to another.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
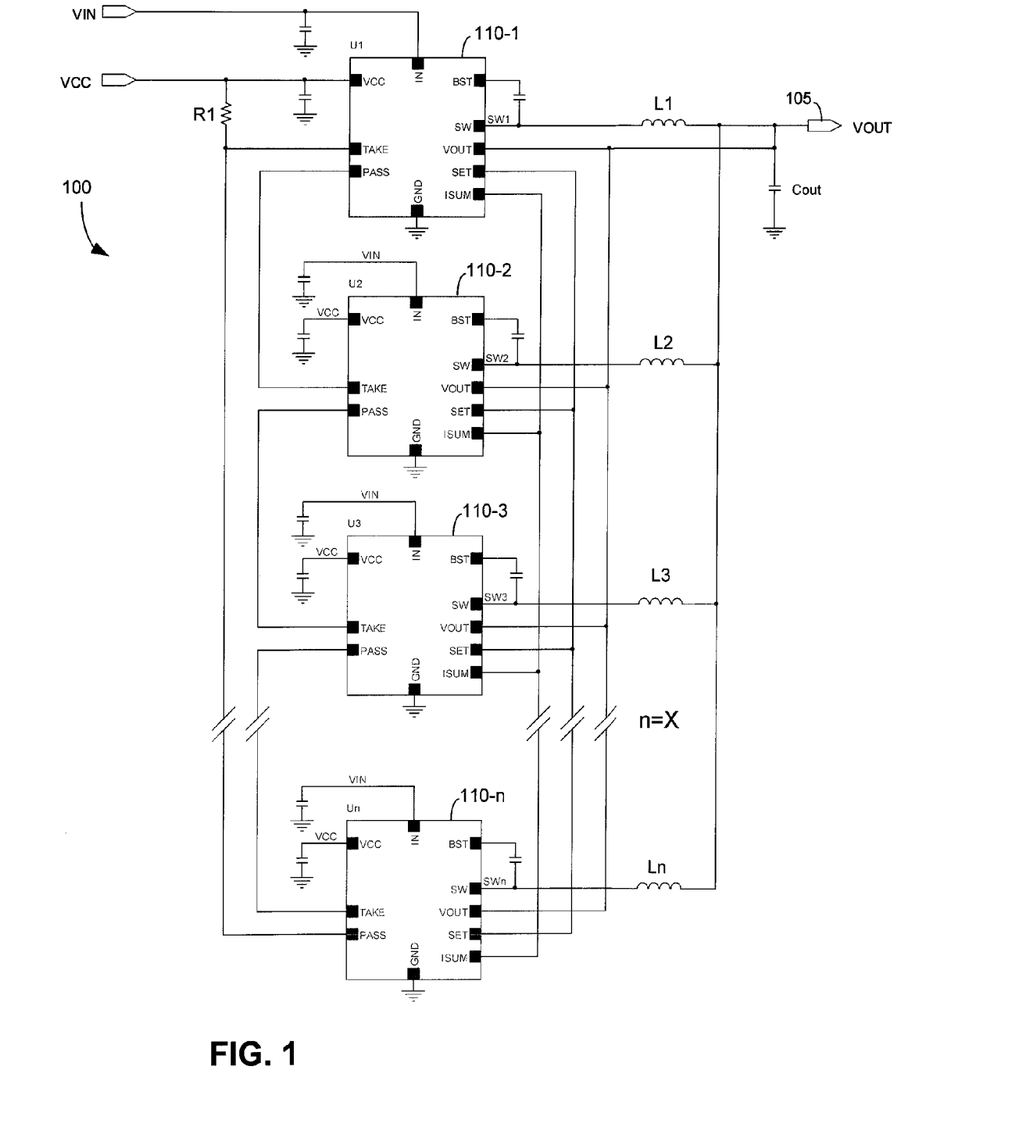
FIG. 1 is a schematic diagram of a multiphase power supply in accordance with an embodiment of the present invention.

FIG. 1 is a schematic diagram of a multiphase power supply 100 in accordance with an embodiment of the present invention. In the example of FIG. 1, the power supply 100 comprises a plurality of constant ON-time (COT) DC-DC converter integrated circuits (ICs) 110 (i.e., 110-1, 110-2, . . . , 110-n). In one embodiment, each COT DC-DC converter IC 110 comprises a constant ON-time DC-DC buck converter. It should be noted that a COT DC-DC converter IC 110 can also be a boost converter, for example. In one embodiment, a COT DC-DC converter IC 110 is implemented as a single-chip, monolithic IC with a plurality of pins. A COT DC-DC converter IC 110 is also simply referred to herein as a "converter 110" for ease of discussion.

In the example of FIG. 1, the converters 110 are configured to operate on their own without a centralized controller. This advantageously allows the power supply 100 to have interleaved output phases without being constrained by the limitations of the centralized controller. The power supply 100 is thus scalable to accept additional converters 110 for higher load current. As will be more apparent below, the operation of the converters 110 may be coordinated using a first synchronization signal in the form of a SET signal and a second synchronization signal in the form of a GO indicator. The SET signal may be generated by one converter 110 and transmitted in parallel to the other converters 110, while the GO indicator may be propagated from one converter 110 to another converter 110. A converter 110 may turn ON in synchronization with the first and second synchronization signals.

In the example of FIG. 1, the converter 110-1 generates an output voltage at a first phase, the converter 110-2 generates an output voltage at a second phase, and so on. The power supply 100 may have a number of output phases equal to the number of converters 110 in the power supply 100. The output voltage VOUT of the power supply 100, which is at the node 105, is thus generated from the output voltages of the converters 110.

A converter 110 may include an SW pin coupled to an output node of its power stage and a VOUT pin, which is coupled to the output voltage VOUT of the power supply 100. Accordingly, a feedback voltage that is indicative of the output voltage VOUT of the power supply 100 may be received from the VOUT pin. In the example of FIG. 1, the output node of the power stage of a converter 110 is coupled to the node 105 of the power supply 100 by way of a corresponding output inductor. More specifically, an output inductor L1 couples the SW pin of the converter 110-1 to the node 105, an output inductor L2 couples the SW pin of the converter 110-2 to the node 105, and so on. The output inductors may be tied together at the node 105 to generate the output voltage VOUT of the power supply 100.

In one embodiment, a converter 110 includes a TAKE pin for receiving a GO indicator and a PASS pin for transmitting a GO indicator. The TAKE and GO pins of the converters 110 may be serially chained to propagate the GO indicator from one converter 110 to the next converter 110. A GO indicator may be a positive pulse, for example. In one embodiment, a converter 110 turns ON only in response to receiving a GO indicator at its TAKE pin. For example, a converter 110 may wait for a rising edge of a positive pulse at its TAKE pin before turning ON. When a converter 110 turns ON, it turns ON its internal output switch (e.g., transistor MN3 in FIG. 2) to connect an input voltage (e.g., voltage VIN in FIG. 2) to a corresponding output inductor (e.g., inductor L8 in FIG. 2). The output switch may be used in conjunction with a free-wheeling diode or a synchronous switch (e.g., transistor MN4 in FIG. 2). The output switch is also referred to as a "high side switch" because it connects the input voltage to the output inductor. Being a COT DC-DC converter, the converter 110 turns ON its output switch for a predetermined, constant length of time. At the same time, the converter 110 outputs a GO indicator at its PASS pin. A GO indicator may be a pulse with a pulse time that is set by a one-shot circuit (e.g., one-shot circuit 252 in FIG. 2). The next converter 110 in the sequence may turn ON on a negative edge of the pulse. Therefore, the width of the output of the one-shot circuit may be the delay time for the next converter 110 that will turn ON. The converters 110 may thus be sequentially connected to turn ON one after another by coupling the PASS pin of a converter 110 to the TAKE pin of the next converter 110 in the sequence.

At initialization during startup, a converter 110 may detect for presence of a resistance value (e.g. see, resistor R1) at its TAKE pin to determine whether or not to turn ON (i.e., turn ON its output switch). In the example of FIG. 1, only the converter 110-1 has a resistor R1 connected to its TAKE pin. Accordingly, only the converter 110-1 turns ON during initialization; the other converters 110 wait to receive a GO indicator at their corresponding TAKE pin before turning ON. The converter 110-1 is thus also referred to as the "phase 1" converter because it provides an output voltage at a first phase of the power supply 100, the converter 110-2 is also referred to as the "phase 2" converter because it provides an output voltage at a second phase of the power supply 100, etc.

In the example of FIG. 1, a converter 110 may also include an ISUM pin for outputting a monitor current that is indicative of the current flowing through its output inductor, a BST pin for connecting a bootstrap capacitor, a VCC pin for receiving a supply voltage, and a GND pin for connecting a ground reference.

In the example of FIG. 1, a converter 110 further includes a SET pin for transmitting or receiving a SET signal that adds another layer of interleaving synchronization, which compensates for circuit mismatches between converters 110 in a multiphase power supply. In a nutshell, the phase 1 converter 110, i.e. the converter 110 that will turn ON first upon power up, continuously generates a SET signal at the SET pin. In this example, the phase 1 converter 110 (the converter 110-1 in FIG. 1) also serves as a master converter that continuously generates the SET signal, while the other converters 110 (the converters 110-2, 110-3, etc.) serve as slave converters that receive the SET signal in parallel.

In the example of FIG. 1, the SET signal generated by the master converter 110 (the converter 110-1 in FIG. 1) may comprise N pulses, with N corresponding to the number of phases in the multiphase power supply 100. The slave converters 110 accept the SET signal at the SET pin and generate their PWM signal in synchronization with a GO indicator received at the TAKE pin. The converters 110 thus turn ON in sequence, using the SET signal and a GO indicator for interleaving synchronization. The comparator stages of the slave converters 110 are disabled during startup.

Figure 2:
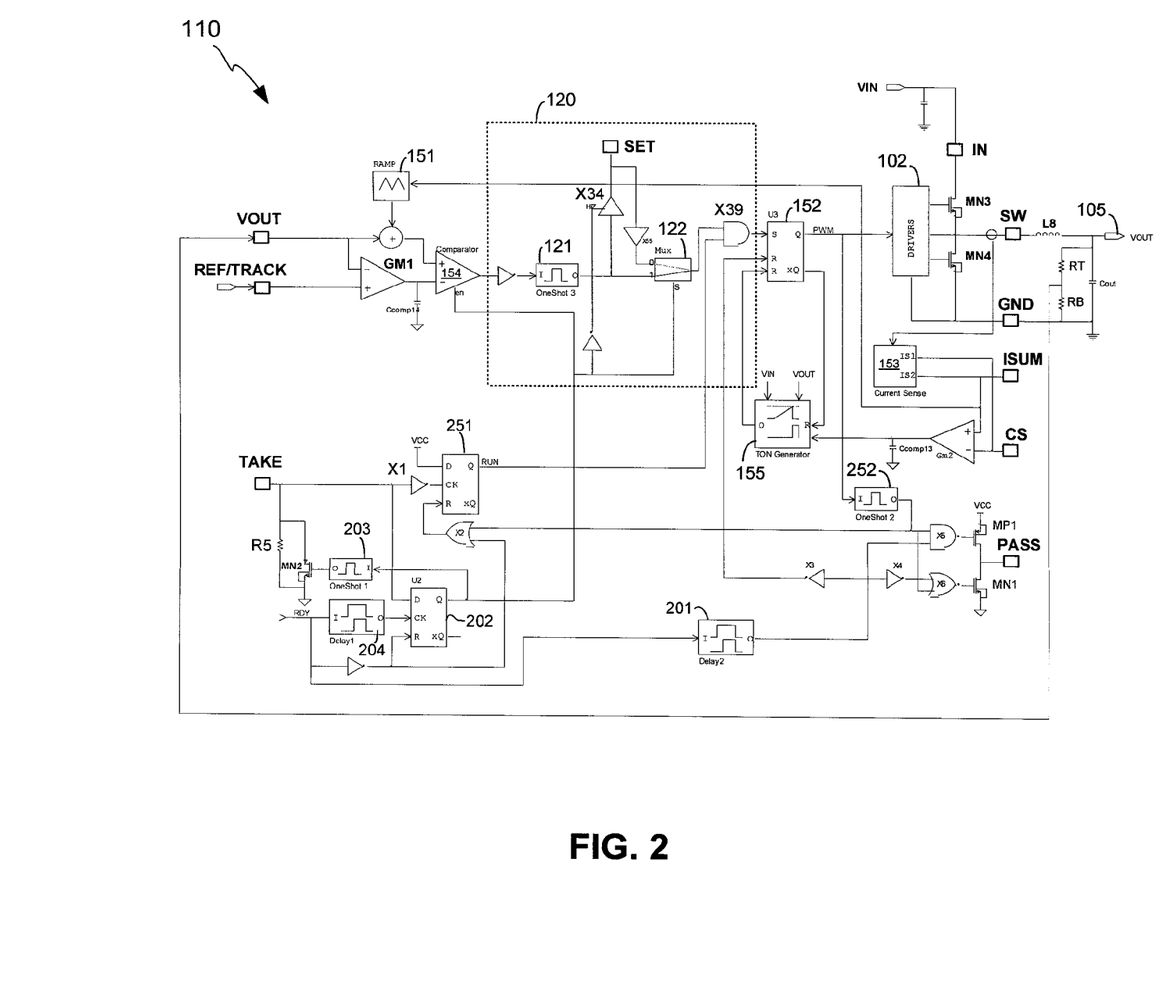
FIG. 2 is a schematic diagram of a COT DC-DC converter IC in accordance with an embodiment of the present invention.

FIG. 2 is a schematic diagram of a COT DC-DC converter IC 110 in accordance with an embodiment of the present invention. FIG. 2 shows the IN, SW, GND, ISUM, PASS, TAKE, VOUT, and SET pins. In the example of FIG. 2, the converter 110 further includes a REF/TRACK pin for receiving an error reference signal (which in this example is an error reference voltage) and a CS pin for receiving a current sense signal. As can be appreciated, a pin of the converter 110 may or may not be used and may have fewer or more pins depending on the particulars of the application.

In the example of FIG. 2, a driver circuit 102 receives a PWM signal that controls switching of the output switch MN3 (e.g., a power field effect transistor (FET)) at the power stage of the converter 110. The driver circuit 102 turns ON the output switch MN3 during the ON time of the PWM signal and turns OFF the output switch MN3 during the OFF time of the PWM signal. The PWM signal has a fixed ON-time because the converter 110 is a COT DC-DC converter. The power stage further includes a switch MN4 (e.g., a power FET), which synchronously switches with the output switch MN3. That is, the switch MN4 is OFF when the output switch MN3 is ON, and the switch MN4 is ON when the output switch MN3 is OFF. In the example of FIG. 2, the output node of the power stage is connected to the SW pin. Accordingly, when the converter 110 turns ON, the output switch MN3 is switched ON to connect the input voltage VIN at the IN pin to the output inductor L8 at the SW pin. The other end of the output inductor L8 is connected to the node 105 of the power supply.

In the example of FIG. 2, a current sense circuit 153 senses the output inductor current that flows out of the SW pin, through the output inductor L8, and to the node 105. The current sense circuit 153 outputs a corresponding monitor current (IS2) at the ISUM pin and a current sense signal (IS1) at the CS pin. The monitor current at the ISUM pin and the current sense signal at the CS pin may be the same current signal, albeit provided separately. With multiple converters 110, each converter 110 may have its CS pin separately connected to its own separate CS resistor. On the other hand, the ISUM pins of all the converters 1110 may be connected together to a common ISUM resistor, where the ISUM resistor value equals the value of the CS resistor divided by the number of converters 110. This allows for $$VCS=IS1*R \text{ and } VISUM=(IS2*n)* (R/n) => VCS=VISUM \quad \text{(EQ. 1)}$$

where VCS is the voltage on the CS pin, IS1 is the current on the CS pin, R is the CS resistor, VISUM is the voltage on the ISUM pin, n is the number of converters 110, and IS2 is the current on the ISUM pin.

In the example of FIG. 2, a feedback voltage (FB) indicative of the output voltage VOUT of the power supply 100 at the node 105 is received at the VOUT pin from, for example, an external feedback network comprising the resistors RT and RB. An error reference voltage (REF) that is received on the REF/TRACK pin controls the level of the output voltage VOUT of the power supply 100. An external circuit (not shown), such as a microprocessor or a discrete circuit, may be coupled to the REF/TRACK pin to set the error reference voltage and thus the level of the output voltage VOUT of the power supply 100. The error reference voltage may also be from an internal reference generator. When the REF/TRACK pins of all the converters 110 in the power supply 100 are connected together, the voltage on a REF/TRACK pin is dominated by the converter 110 that has the highest voltage on its REF/TRACK pin.

An amplifier GM1 compares the feedback voltage to the error reference voltage to determine the level of the output voltage relative to the error reference voltage and correspondingly outputs a compensation signal. It is to be noted that the comparator output stages are the same for all phases of the power supply 100 because all of the converters 110 have the same signals at the ISUM, VOUT, and REF/TRACK pins.

The current sense circuit 153 provides a monitor current that is indicative of the output inductor current. The ramp generator 151 removes the DC voltage of the monitor current at the ISUM pin and then outputs an AC (alternating current) ramp voltage. A comparator 154 compares the sum of the ramp voltage and the feedback voltage to the compensation voltage at the output of the amplifier GM1. When the sum of the feedback and ramp voltages is less than the compensation voltage, and depending on the state of the SET signal at the SET pin as further discussed below, the latch 152 will be set (PWM=1) and the timer of the ON-time generator 155 is started. The latch 152 will be reset (PWM=0) when the timer of the ON-time generator 155 expires (PWM=0). The PWM signal output of the latch 152 controls the switching of the output switch MN3. In one embodiment, the output switch MN3 turns ON when the PWM signal is HIGH (PWM=1) and turns OFF when the PWM signal is LOW (PWM=0). Because the timer of the ON-time generator 155 has a constant timing value, the output switch MN3 is turned ON for a fixed duration when the converter 110 is turned ON.

In the example of FIG. 2, the converter 110 includes an internal node for accepting a ready signal (RDY). The ready signal may be from an internal power on reset (POR) circuit (not shown) of the converter 110. The ready signal may be asserted (RDY=1) when the converter 110 is enabled and all of its voltage and current biasing are proper. When the ready signal is LOW (RDY=0), a D flip-flop 202 is reset and the switches MP1, MN1, and MN2 are OFF. The phase 1 converter 110 has a resistor between the TAKE pin and the VCC supply rail (e.g., see resistor R1 in FIG. 1). Therefore, the TAKE pin of the phase 1 converter 110 is HIGH, while the TAKE pin of the other converters 110 are pulled LOW by a resistor R5. When the ready signal is HIGH (RDY=1), the D flip-flop 202 is reset and goes LOW, and a logic HIGH is clocked from the D input to the Q output of the D flip-flop 202 after a delay (Delay1) through the delay line 204. Among the converters 110 in the multiphase power supply 100, only the phase 1 converter 110 clocks in a logic HIGH into its D flip-flop 202, which turns ON the switch MN2 for a short period of time that is set by the one-shot circuit 203. This results in the TAKE pin being pulled LOW then HIGH, thereby clocking the D flip-flop 251. The RUN signal at the Q output of the D flip-flop 251 therefore goes from LOW to HIGH to allow the phase 1 converter 110 to turn ON first. The TAKE pins of the other converters 110 remain LOW during this time. The gates X5 and X6 begin to accept a signal from the one-shot circuit 252 after a delay time (Delay2) dictated by the delay line 201. In one embodiment, the delay time through the delay line 201 (Delay2) is longer than the delay through the delay line 204 (Delay1) plus the pulse time of the one-shot circuit 203.

In other embodiments, the resistor for indicating the phase 1 converter 110 may also be placed from the TAKE pin to ground. In that case, the resistor R5 is connected to the VCC supply rail instead of the TAKE pin, and the D input of the D flip-flop 202 is connected to the output of the inverter X1 instead of the TAKE pin.

In the example of FIG. 2, an interleaving synchronization circuit 120 is included in the path between the comparator stage and the output stage of the converter 110. In the example of FIG. 2, for a master converter 110 (which is also the phase 1 converter in this example), the amplifier GM1, the comparator 154, a smart one-shot circuit 121, and a buffer X34 internally generate N SET pulses to trigger the slave converters 110 in the multiphase power supply. In the example of FIG. 2, the ramp generator 151 is configured to have a frequency of $$N*fs \qquad (EQ. 2)$$

where fs is the phase switching frequency of the multiphase power supply. In one embodiment, the smart one-shot circuit 121 works as a conventional one-shot circuit in steady state condition. During load step condition when the output of the comparator 154 is always HIGH, the output the smart one-shot circuit 121 will be set after a minimum off time Toffmin, then turns ON for a time Toneshot3, then resets for a minimum off time Toffmin, and so on. This will repeat until the HIGH condition of the comparator 154 output disappears. In this way, an SET pulse will generate a high frequency pulse during the transient, improving the transient response.

In the example of FIG. 2, internally generated SET pulses from the smart one-shot circuit 121 are presented to a first input of a multiplexer 122. A second input of the multiplexer 122 is coupled to receive SET pulses from the SET pin. The multiplexer 122 outputs either the internally generated SET pulses or the SET pulses from the SET pin. The multiplexer 122 of the master converter 110 selects the internally generated SET pulses; the multiplexer 122 of the slave converters 110 selects the SET pulses from the SET pin. The multiplexer 122 outputs the selected SET pulses to a gate X39, which allows the SET pulses to be synchronized with the RUN signal output of the D flip-flop 251 for interleaving synchronization. The output of the gate X39 is presented to the input of the D flip-flop 152, which generates the PWM signal for controlling switching of the output switch MN3.

Figure 3:
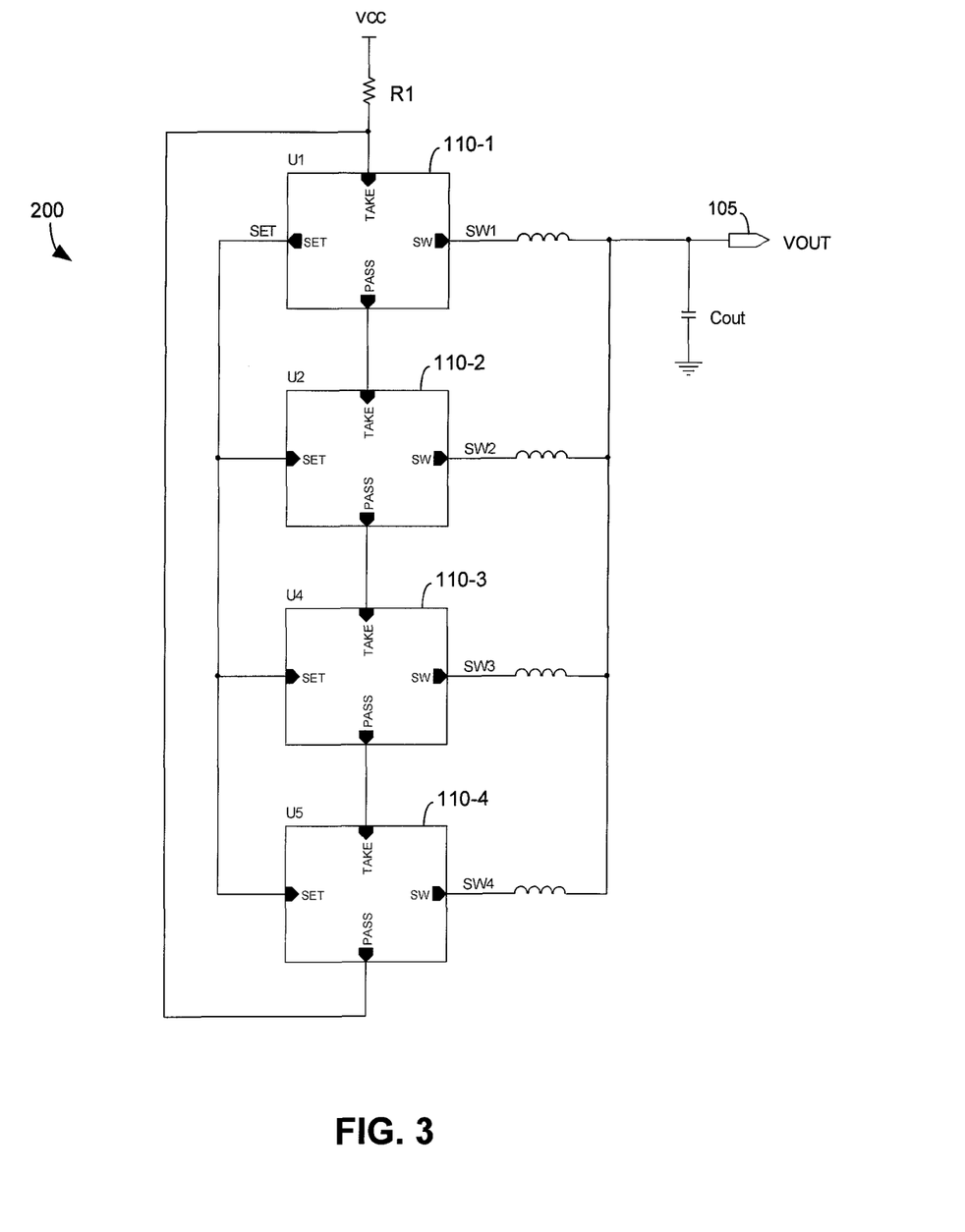
FIG. 3 is a schematic diagram of a multiphase power supply in accordance with an embodiment of the present invention.
Figure 4:
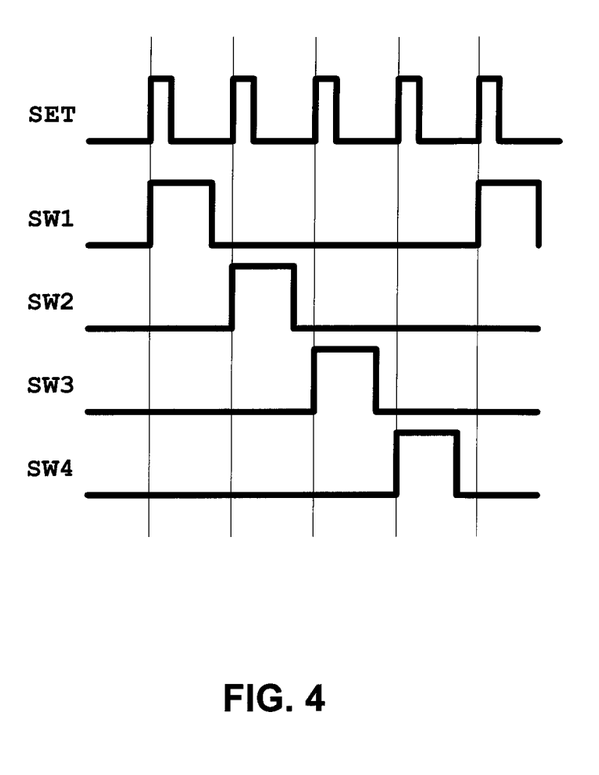
FIG. 4 is a timing diagram of signals of the multiphase power supply of FIG. 3.

FIG. 3 is a schematic diagram of a multiphase power supply 200 in accordance with an embodiment of the present invention. In the example of FIG. 3, the power supply 200 has four output phases provided by the converters 110-1, 110-2, 110-3, and 110-4, respectively. The converter 110-1 serves as the master, and the converters 110-2, 110-3, and 110-4 serve as slaves. The converter 110-1 outputs a SET signal with a plurality of pulses (SET pulse), and the converters 110-2, 110-3, and 110-4 synchronize to the SET signal in conjunction with a GO indicator. The GO indicator is output by the master converter 110-1 and propagated from one converter 110 to another. More particularly, each converter 110 takes turn to turn ON when it receives the GO indicator and detects a SET pulse. After turning ON, a converter 110 passes the GO indicator to the next converter 110 in the phase sequence, which turns ON when it detects the SET pulse, etc. The master converter 110-1 receives the GO indicator from the converter 110-4 to restart the phase sequence. FIG. 4 is a timing diagram that shows the SET signal generated by the converter 110-1 and the output signals SW1, SW2, SW3, and SW4 generated by the converters 110-1, 110-2, 110-3, and 110-4, respectively.

Figure 5:
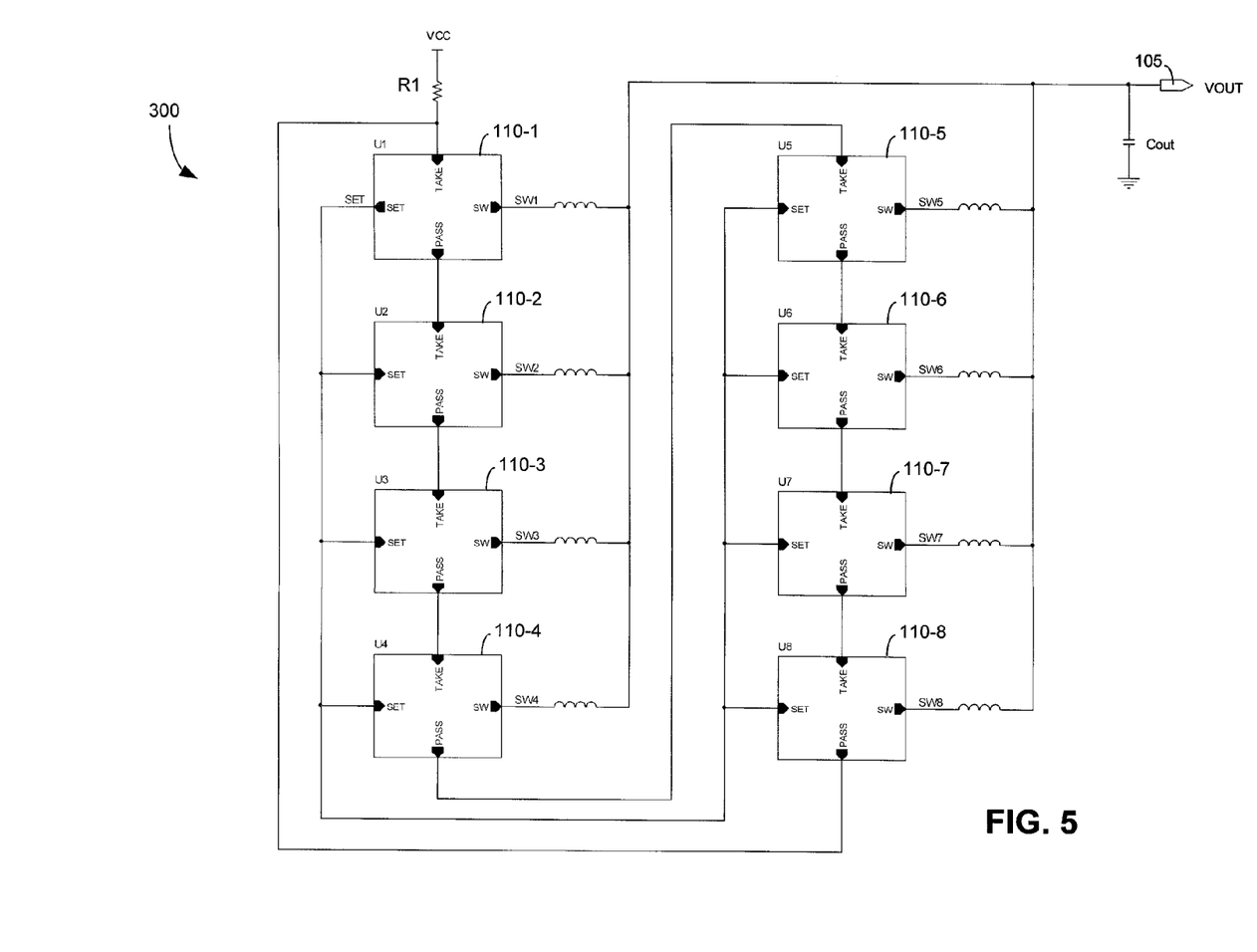
FIG. 5 is a schematic diagram of a multiphase power supply in accordance with an embodiment of the present invention.

One problem with the arrangement of the converters 110 in the power supply 200 (and 100) is that the number of output phases is limited by the phase switching frequency of power supply. As the phase switching frequency increases, the number of converters 110 that can be incorporated in the power supply decreases. This problem is further illustrated with reference to FIG. 5, which is a schematic diagram of a multiphase power supply 300 in accordance with an embodiment of the present invention. The multiphase power supply 300 is the same as the multiphase power supply 200 except for having eight phases instead of four. More particularly, the power supply 300 has converters 110-1 to 110-8, which generate output signals SW1 to SW8, respectively.

Figure 6:
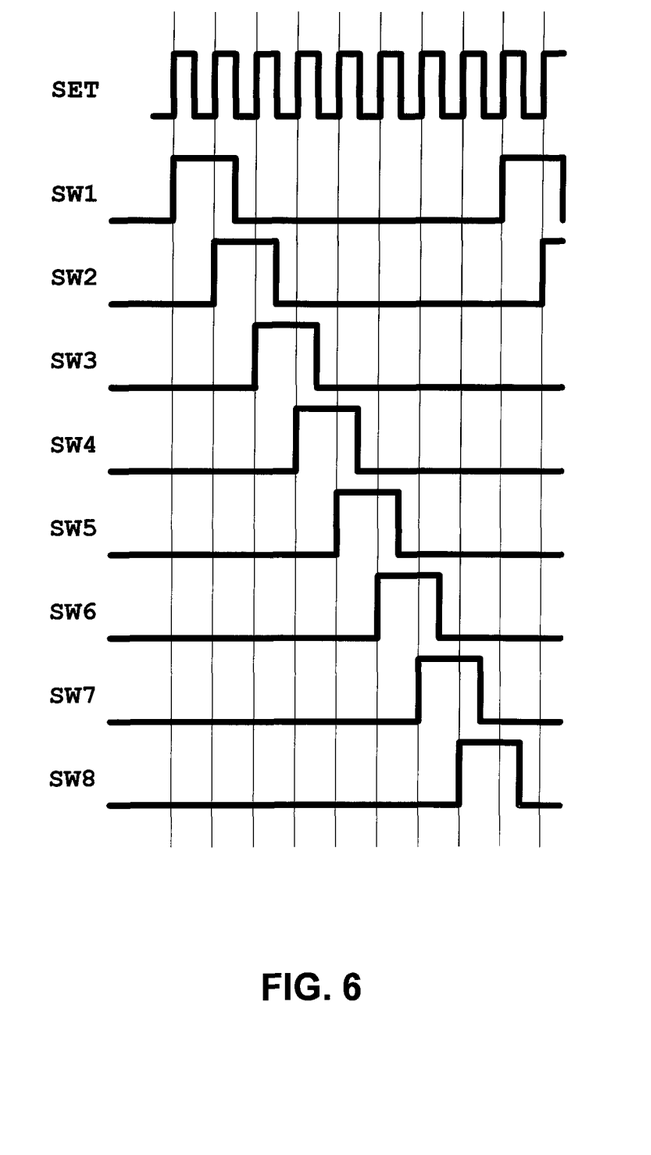
FIG. 6 is a timing diagram of signals of the multiphase power supply of FIG. 5.

FIG. 6 is a timing diagram of signals of the multiphase power supply 300. FIG. 6 shows the SET signal generated by the converter 110-1 and the output signals SW1 to SW8 generated by the converters 110-1 to 110-8, respectively. Because each converter 110 constitutes a phase, the number of converters 110 that may be employed is constrained by the phase switching frequency of the multiphase power supply. More particularly, the turn OFF edge of the output signal SW1 from the master converter 110-1 may cause the SET signal for the converter 110-2 to come early if they occur very close to each other. This puts a limit on the output current that can be delivered by the multiphase power supply for a given phase switching frequency.

Figure 7:
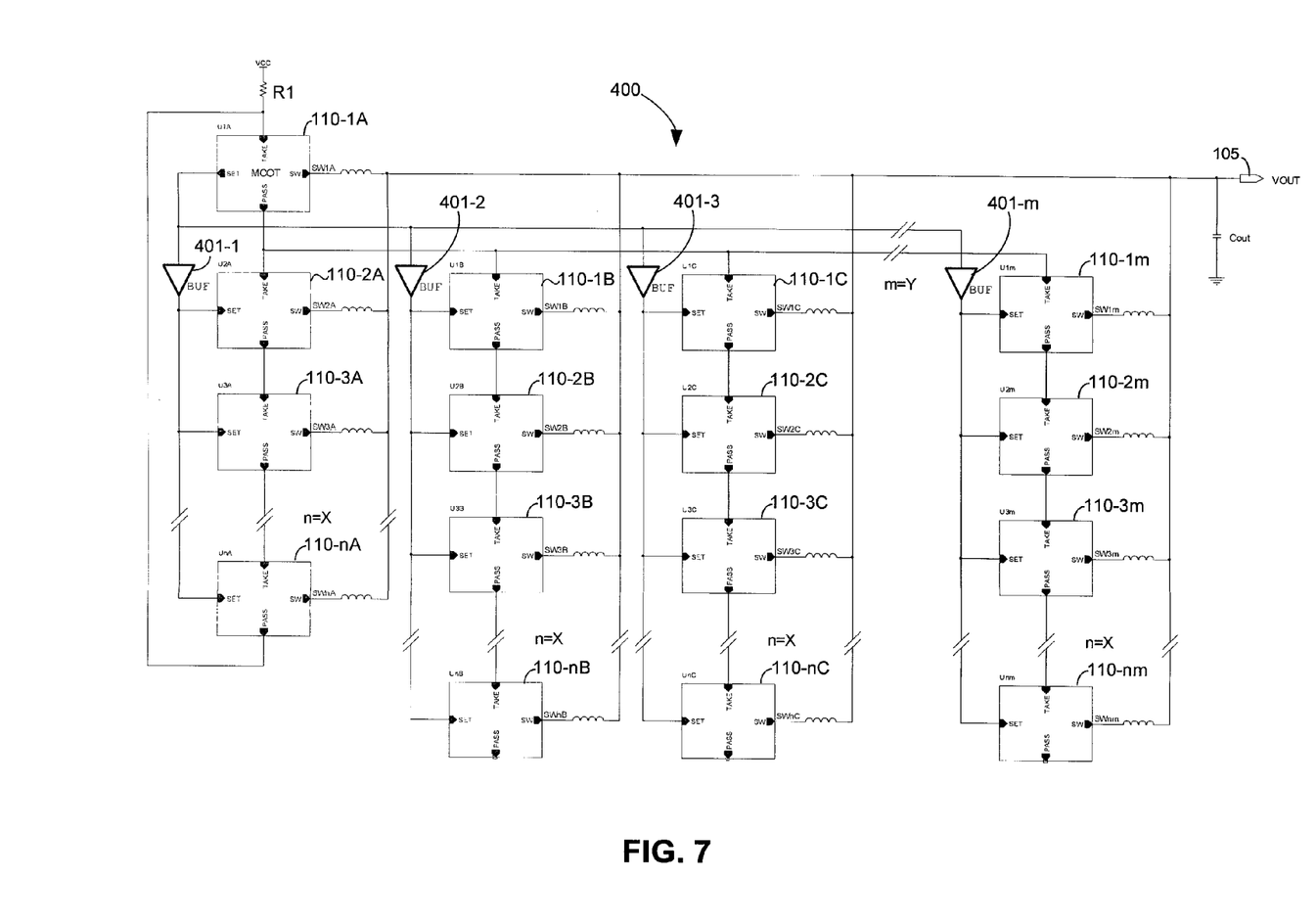
FIG. 7 is a schematic diagram of a multiphase power supply in accordance with an embodiment of the present invention.

FIG. 7 is a schematic diagram of a multiphase power supply 400 in accordance with an embodiment of the present invention. In the example of FIG. 7, the power supply 400 comprises a plurality of converters 110, one for each phase. The converters 110 of the multiphase power supply 400 collectively generate an output voltage at the node 105. It is to be noted that although the power supplies disclosed herein employ the converters 110, other COT DC-DC converter ICs may also be employed without detracting from the merits of the present invention. COT DC-DC converter ICs are also disclosed in commonly-assigned U.S. patent application Ser. No. 14/847,989, filed on Sep. 8, 2015, which is incorporated herein by reference in its entirety.

In the example of FIG. 7, the master converter 110-1 is configured as the master and accordingly generates a SET signal that comprises a plurality of SET pulses. The SET signal is received in parallel by a plurality of groups of converters 110. In the example of FIG. 7, the SET signal is received in parallel by (a) a first group of converters comprising converters 110-2A, 110-3A, . . . , 110-nA, (b) by a second group of converters comprising converters 110-1B, 110-2B, 110-3B, . . . , 110-nB, (c) by a third group of converters comprising converters 110-1C, 110-2C, 110-3C, . . . , 110-nC, etc.

In the example of FIG. 7, a GO indicator is passed sequentially, as previously described, in each group of converters. For the group of converters that includes the master converter (also referred to as "master group"), the PASS pin of the master converter 110-1A is connected to the TAKE pin of the converter 110-2A, the PASS pin of the converter 110-2A is connected to the TAKE pin of the converter 110-3A, and so on, with the PASS pin of the converter 110-nA (i.e., the last converter 110 in the group) being connected to the TAKE pin of the master converter 110-1A. This allows the GO indicator to be propagated sequentially through the converters 110 in the master group.

It is to be noted that for a group of converters that does not include the master converter (also referred to as a "non-master group"), the PASS pin of the last converter 110 in the non-master group is not necessarily connected to a TAKE pin of another converter 110. This is because, in the example of FIG. 7, the PASS pin of the master converter 110-1A is also connected to the TAKE pin of the first converter 110 (e.g., converter 110-1B, converter 110-C, etc.) of the non-master group, allowing the phase sequence of the non-master group to be restarted with the master group.

In the example of FIG. 7, the master converter 110-1 generates a SET signal with a plurality of SET pulses. The SET signal is provided in parallel to the groups of converters. A buffer 401 (i.e., 401-1, 401-2, 401-3, . . . , 401-$m$) may provide additional drive, if needed, to transmit the SET signal to one or more groups of converters. In the example of FIG. 7, the converters 110-1A, 110-1B, 110-1C, . . . , 110-1$m$ provide m phases that are tuned ON at the same time, i.e., in-phase. Similarly, the converters 110-2A, 110-2B, 110-2C, . . . , 110-2$m$ provide m phases that are tuned ON at the same time, and so on. Accordingly, in the multiphase power supply 400, two or more output phases are turned ON at the same time per SET pulse. This allows more converters 110 to be incorporated, thereby allowing the power generation capability of the multiphase power supply 400 to be scaled to meet different, and increasing, power requirements.

Figure 8:
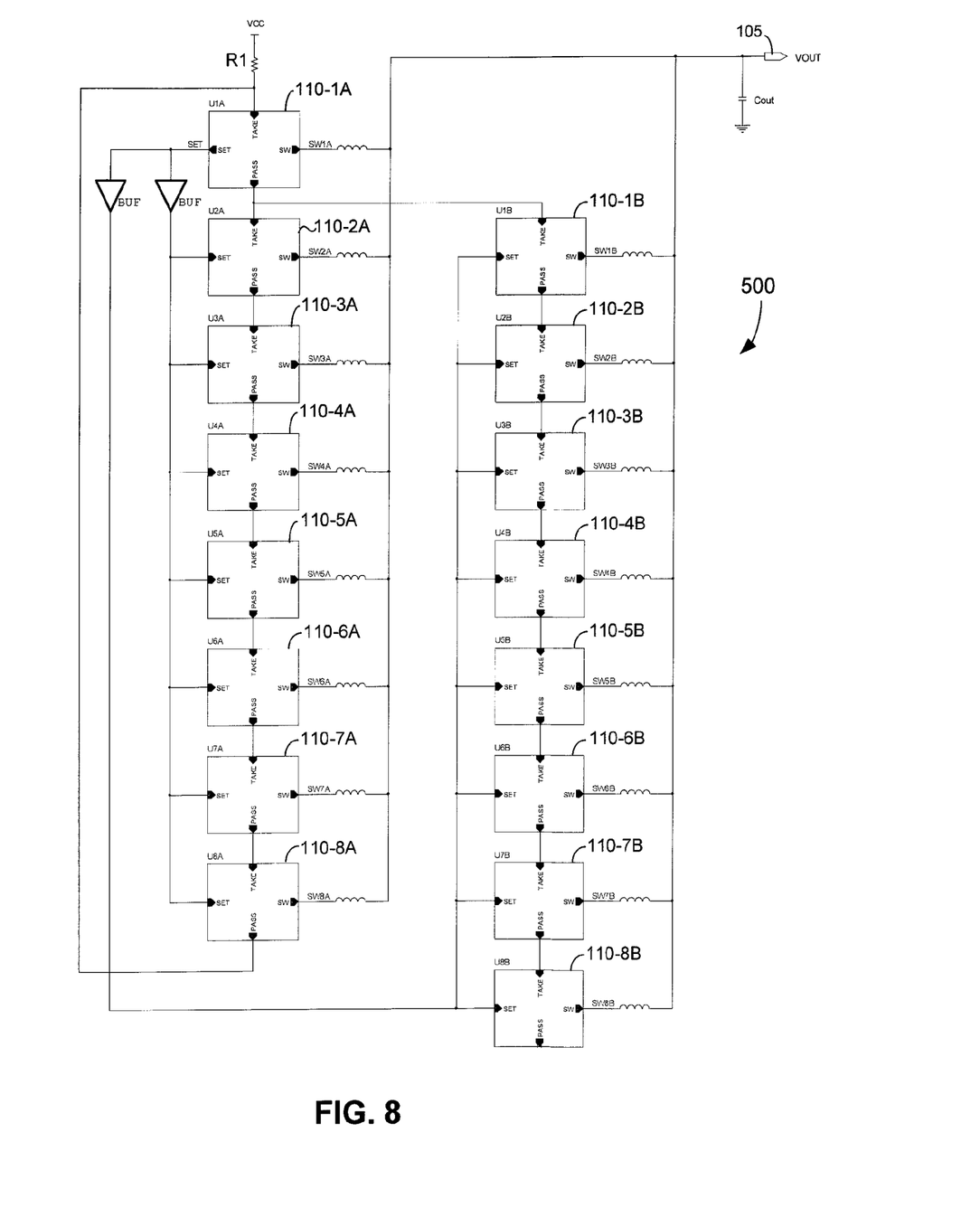
FIG. 8 is a schematic diagram of a multiphase power supply in accordance with an embodiment of the present invention.

FIG. 8 is a schematic diagram of a multiphase power supply 500 in accordance with an embodiment of the present invention. The multiphase power supply 500 is a particular embodiment of the power supply 400 with 16 phases, i.e., 16 converters 110 that collectively generate an output voltage at the node 105. In the example of FIG. 8, the converters 110 are arranged into two groups of converters, with each group of converters having eight converters 110. Accordingly, in the example of FIG. 8, the multiphase power supply 500 has an arrangement of 8×2 converters 110. In the example of FIG. 8, the SET signal from the master converter 110-1A is provided in parallel to a non-master group of converters comprising the converters 110-1B to 110-8B and to the rest of the master group of converters comprising the converters 110-2A to 110-8A. Note that that PASS pin of the converter 110-8A is connected to the TAKE pin of the master converter 110-1A, whereas the PASS pin of the converter 110-8B is left unconnected.

Figure 9:
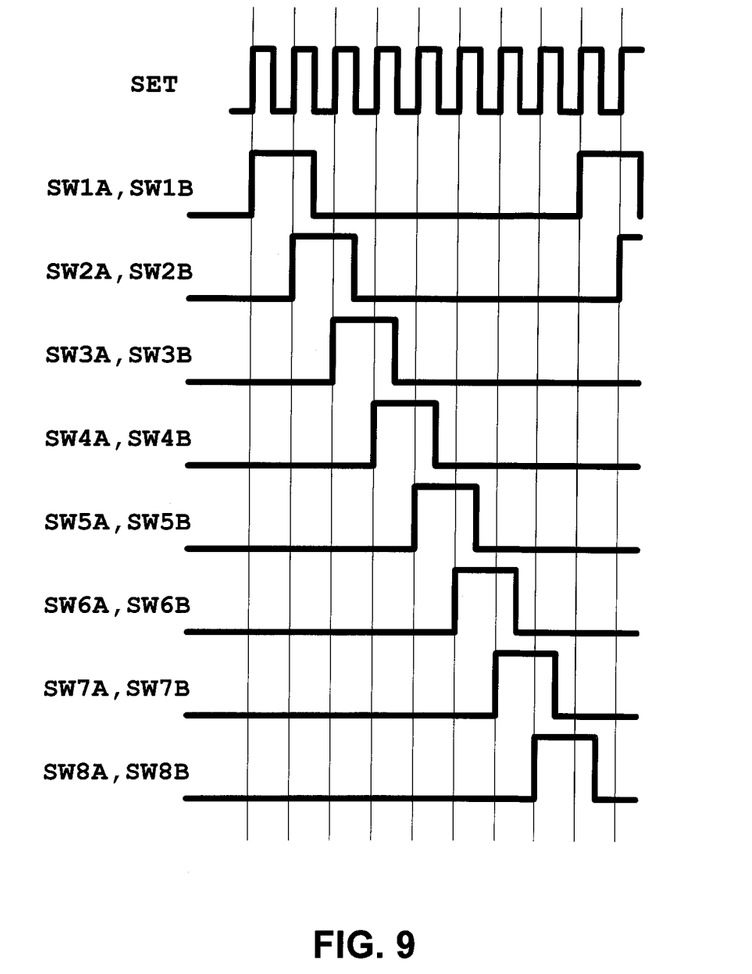
FIG. 9 is a timing diagram of signals of the multiphase power supply of FIG. 8.

FIG. 9 is a timing diagram of signals of the multiphase power supply 500. FIG. 9 shows the SET signal generated by the master converter 110-1A, the output signal SW1A generated by the master converter 110-1A, the output signal SW1B generated by the converter 110-1B, the output signal SW2A generated by the converter 110-2A, the output signal SW2B generated by the converter 110-2B, the output signal SW3A generated by the converter 110-3A, etc. As illustrated in FIG. 9, each SET pulse allows for generation of two output signals SW. That is, two phases are turned ON at the same time. More particularly, the master converter 110-1A and the converter 110-1B are turned ON at the same time in synchronization with a rising edge of a first pulse of the SET signal (see output signals SW1A and SW1B), the converters 110-2A and 110-2B are turned ON at the same time n synchronization with a rising edge of a second pulse of the SET signal (see output signals SW2A and SW2B), the converters 110-3A and 110-3B are turned ON at the same time in synchronization with a rising edge of a third pulse of the SET signal (see output signals SW3A and SW3B), and so on. The phase sequence repeats at the end of the turn ON period of the converters 110-8A and 110-8B (see output signals SW8A and 8B). Not shown in FIG. 9 is the GO indicator, which the converters 110 use for synchronization together with the SET signal as previously explained.

Figure 10:
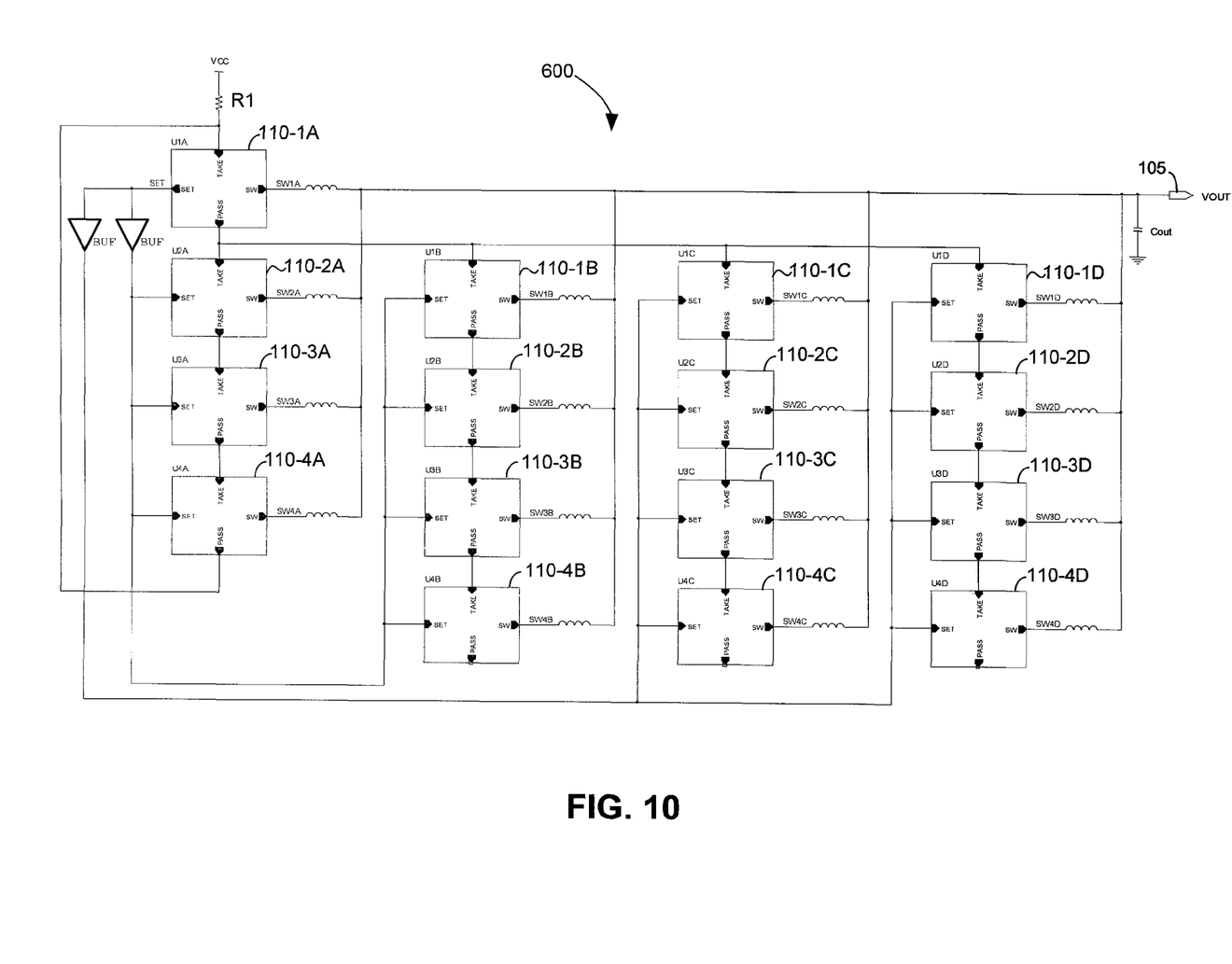
FIG. 10 is a schematic diagram of a multiphase power supply in accordance with an embodiment of the present invention.

As can be appreciated from the foregoing, in light of the present disclosure, a multiphase power supply may have various arrangements of converters 110, with two or more converters 110 turning ON at the same time. As another example, FIG. 10 is a schematic diagram of a multiphase power supply 600 in accordance with an embodiment of the present invention. The power supply 600 is a particular embodiment of the power supply 400 (see FIG. 7) with 16 phases provided by a 4×4 arrangement of converters 110.

More particularly, the power supply 600 comprises 16 converters 110 that are arranged into four groups of converters, with each group of converters having four converters 110. In the example of FIG. 10, the converters 110-1A, 110-2A, 110-3A, and 110-4A belong to a master (first) group of converters; the converters 110-1B, 110-2B, 110-3B, and 110-4D belong to a second group of converters; the converters 110-1C, 110-2C, 110-3C, and 110-4C belong to a third group of converters; and the converters 110-1D, 110-2D, 110-3D, and 110-4D belong to a fourth group of converters.

Figure 11:
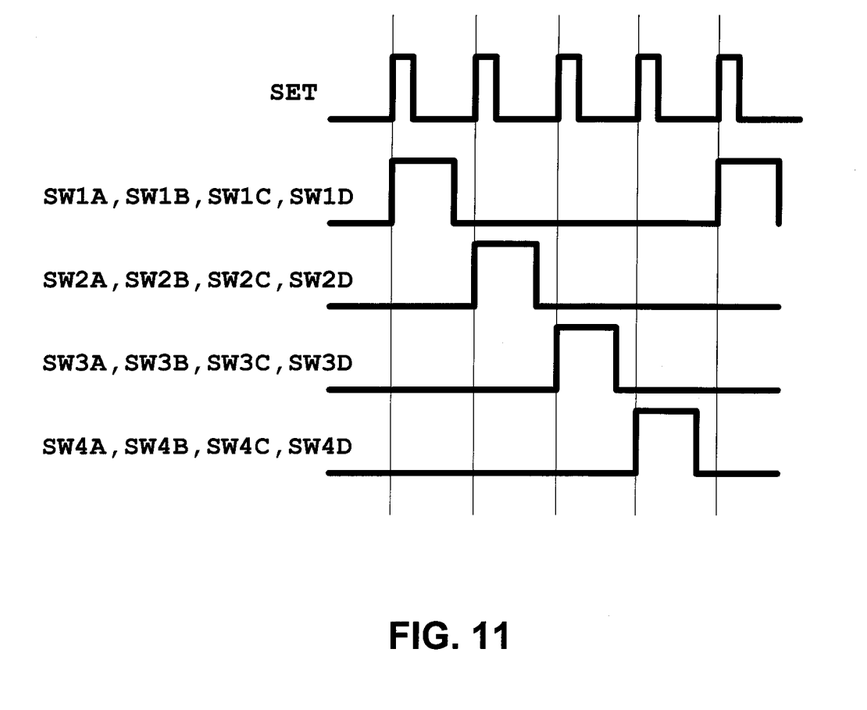
FIG. 11 is a timing diagram of signals of the multiphase power supply of FIG. 10.

FIG. 11 is a timing diagram of signals of the multiphase power supply 600. FIG. 11 shows the SET signal generated by the master converter 110-1A, the output signal SW1A generated by the master converter 110-1A, the output signal SW1B generated by the converter 110-1B, the output signal SW1C generated by the converter 110-1C, the output signal SW1D generated by the converter 110-1D, the output signal SW2A generated by the converter 110-2A, etc. As illustrated in FIG. 11, each SET pulse allows for generation of four output signals SW. That is, four phases are turned ON at the same time. More particularly, the master converter 110-1A, the converter 110-1B, the converter 110-1C, and the converter 110-1D are turned ON at the same time in synchronization with a rising edge of a first pulse of the SET signal; the converters 110-2A, 110-2B, 110-2C, and 110-2D are turned ON at the same time in synchronization with a rising edge of a second pulse of the SET signal; the converters 110-3A, 110-3B, 110-3C, and 110-3D are turned ON at the same time in synchronization with a rising edge of a third pulse of the SET signal; and the converters 110-4A, 110-4B, 110-4C, and 110-4D are turned ON at the same time in synchronization with a rising edge of a fourth pulse of the SET signal. The phase sequence repeats at the end of the turn ON period of the converters 110-4A, 110-4B, 110-4C, and 110-4D. Not shown in FIG. 11 is the GO indicator, which the converters 110 use for synchronization together with the SET signal as previously explained.

Multiphase power supplies with highly scalable constant ON time DC-DC converter integrated circuits have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A multiphase power supply comprising:
    a first constant ON-time (COT) DC-DC converter integrated circuit (IC) that is configured to generate a first synchronization signal, output the first synchronization signal at a first pin, and propagate a second synchronization signal at a second pin;
    a second COT DC-DC converter IC that is configured to receive the first synchronization signal at a first pin, receive the second synchronization signal at a second pin, and propagate the second synchronization signal at a third pin, the second COT DC-DC converter IC being configured to turn ON with the first COT DC-DC converter IC in synchronization with the first and second synchronization signals;
    a third COT DC-DC converter IC that is configured to receive the first synchronization signal at a first pin, receive the second synchronization signal at a second pin, and propagate the second synchronization signal at a third pin; and
    a fourth COT DC-DC converter IC that is configured to receive the first synchronization signal at a first pin, receive the second synchronization signal at a second pin, and propagate the second synchronization signal at a third pin, the fourth COT DC-DC converter IC being configured to turn ON with the third COT DC-DC converter IC in synchronization with the first and second synchronization signals,
    wherein the first pin of the first COT DC-DC converter IC is connected to the first pin of the second COT DC-DC converter IC and to the first pin of the fourth DC-DC converter IC through a first buffer.

2. The multiphase power supply of claim 1, wherein the first and second COT DC-DC converter ICs are configured to turn ON at a first pulse of the first synchronization signal, and the third and fourth COT DC-DC converter ICs are configured to turn ON at a second pulse of the first synchronization signal, the second pulse immediately following the first pulse.

3. The multiphase power supply of claim 1, wherein the first and second COT DC-DC converter ICs are configured to turn ON at an edge of a first pulse of the first synchronization signal, and the third and fourth COT DC-DC converter ICs are configured to turn ON at an edge of a second pulse of the first synchronization signal, the second pulse immediately following the first pulse.

4. The multiphase power supply of claim 1, wherein the first pin of the first COT DC-DC converter IC is connected to the first pin of the third COT DC-DC converter IC through a second buffer.

5. The multiphase power supply of claim 1, wherein the first, second, third, and fourth COT DC-DC converter ICs are buck converters.

6. A method of operating a multiphase power supply, the method comprising:
    receiving a first synchronization signal at a first pin of a first constant ON-time (COT) DC-DC converter integrated circuit (IC), at a first pin of a second COT DC-DC converter integrated circuit, at a first pin of a third COT DC-DC converter integrated circuit, and at a first pin of a fourth COT DC-DC converter integrated circuit;
    turning ON the first COT DC-DC converter IC with the third COT DC-DC converter IC in synchronization with a first pulse of the first synchronization signal; and
    turning ON the second COT DC-DC converter IC with the fourth COT DC-DC converter IC in synchronization with a second pulse of the first synchronization signal,
    wherein the first and third COT DC-DC converter ICs are turned ON in synchronization with an edge of the first pulse of the first synchronization signal, and the second and fourth COT DC-DC converter Ics are turned ON in synchronization with an edge of the second pulse of the first synchronization signal.

7. The method of claim 6, further comprising:
    receiving a second synchronization signal at a second pin of the first COT DC-DC converter IC;

propagating the second synchronization signal from a third pin of the first COT DC-DC converter IC to a second pin of the second COT DC-DC converter IC; and turning ON the second COT DC-DC converter IC in synchronization with the first and second synchronization signals.

8. The method of claim 7, further comprising:

receiving the second synchronization signal at a second pin of the third COT DC-DC converter IC;

propagating the second synchronization signal from a third pin of the third COT DC-DC converter IC to a second pin of the fourth COT DC-DC converter IC; and turning ON the fourth COT DC-DC converter IC in synchronization with the first and second synchronization signals.

9. The method of claim 6, wherein the first, second, third, and fourth COT DC-DC converter ICs are buck converters.

10. A method of operating a multiphase power supply, the method comprising:

receiving a first synchronization signal at a first pin of a first constant ON-time (COT) DC-DC converter integrated circuit (IC), at a first pin of a second COT DC-DC converter integrated circuit, at a first pin of a third COT DC-DC converter integrated circuit, and at a first pin of a fourth COT DC-DC converter integrated circuit;

turning ON the first COT DC-DC converter IC with the third COT DC-DC converter IC in synchronization with a first pulse of the first synchronization signal; and turning ON the second COT DC-DC converter IC with the fourth COT DC-DC converter IC in synchronization with a second pulse of the first synchronization signal, wherein the first and third COT DC-DC converter ICs are turned ON in synchronization with a rising edge of the first pulse of the first synchronization signal, and the second and fourth COT DC-DC converter ICs are turned ON in synchronization with a rising edge of the second pulse of the first synchronization signal.

11. The method of claim 10, further comprising:

receiving a second synchronization signal at a second pin of the first COT DC-DC converter IC;

propagating the second synchronization signal from a third pin of the first COT DC-DC converter IC to a second pin of the second COT DC-DC converter IC; and turning ON the second COT DC-DC converter IC in synchronization with the first and second synchronization signals.

12. The method of claim 11, further comprising:

receiving the second synchronization signal at a second pin of the third COT DC-DC converter IC;

propagating the second synchronization signal from a third pin of the third COT DC-DC converter IC to a second pin of the fourth COT DC-DC converter IC; and turning ON the fourth COT DC-DC converter IC in synchronization with the first and second synchronization signals.

13. The method of claim 10, wherein the first, second, third, and fourth COT DC-DC converter ICs are buck converters.

14. A method of operating a multiphase power supply, the method comprising:

receiving a first synchronization signal at a first pin of a first constant ON-time (COT) DC-DC converter integrated circuit (IC), at a first pin of a second COT DC-DC converter integrated circuit, at a first pin of a third COT DC-DC converter integrated circuit, and at a first pin of a fourth COT DC-DC converter integrated circuit;

turning ON the first COT DC-DC converter IC with the third COT DC-DC converter IC in synchronization with a first pulse of the first synchronization signal; and turning ON the second COT DC-DC converter IC with the fourth COT DC-DC converter IC in synchronization with a second pulse of the first synchronization signal, wherein the first synchronization signal is generated by a fifth COT DC-DC converter IC that turns ON with the first and second COT DC-DC converter ICs.

15. The method of claim 14, wherein the fifth COT DC-DC converter IC turns ON in synchronization with an internally generated synchronization signal.

16. The method of claim 14, further comprising:

receiving a second synchronization signal at a second pin of the first COT DC-DC converter IC;

propagating the second synchronization signal from a third pin of the first COT DC-DC converter IC to a second pin of the second COT DC-DC converter IC; and turning ON the second COT DC-DC converter IC in synchronization with the first and second synchronization signals.

17. The method of claim 16, further comprising:

receiving the second synchronization signal at a second pin of the third COT DC-DC converter IC;

propagating the second synchronization signal from a third pin of the third COT DC-DC converter IC to a second pin of the fourth COT DC-DC converter IC; and turning ON the fourth COT DC-DC converter IC in synchronization with the first and second synchronization signals.

18. The method of claim 14, wherein the first, second, third, and fourth COT DC-DC converter ICs are buck converters.

* * * * *